US008346731B1

(12) United States Patent
Tsaur et al.

(10) Patent No.: US 8,346,731 B1
(45) Date of Patent: Jan. 1, 2013

(54) TECHNIQUES FOR GLOBAL SINGLE INSTANCE INDEXING FOR BACKUP DATA

(75) Inventors: Ynn-Pyng Tsaur, Oviedo, FL (US); Kirk Searls, Maitland, FL (US)

(73) Assignee: Symantec Corporation, Mountain View, CA (US)

( * ) Notice: Subject to any disclaimer, the term of this patent is extended or adjusted under 35 U.S.C. 154(b) by 896 days.

(21) Appl. No.: 11/931,880

(22) Filed: Oct. 31, 2007

Related U.S. Application Data

(60) Provisional application No. 60/976,313, filed on Sep. 28, 2007.

(51) Int. Cl.
*G06F 17/30* (2006.01)
(52) U.S. Cl. ...................................... 707/673
(58) Field of Classification Search .................. 707/1, 3, 707/200, 204, 640, 673
See application file for complete search history.

(56) References Cited

U.S. PATENT DOCUMENTS

2005/0131904 A1* 6/2005 Margolus et al. ............... 707/10
2006/0057551 A1* 3/2006 Vashi et al. .................... 434/350
2007/0100913 A1* 5/2007 Sumner et al. ................ 707/204

OTHER PUBLICATIONS

Wikipedia user, "Database" Sep. 26, 2006, Wikipedia.org <http://en.wikipedia.org/w/index.php?title=Database&oldid=77918197>, p. 1-7.*
Ramakrishnan et al., "Database Management Systems" 2002, McGraw-Hill, Third Ed., p. cover, inside page, p. 9, 274, and 276.*

* cited by examiner

*Primary Examiner* — Amresh Singh
(74) *Attorney, Agent, or Firm* — Wilmer Cutler Pickering Hale and Dorr LLP

(57) ABSTRACT

Techniques for global single instance indexing for backup data are disclosed. In one particular exemplary embodiment, the techniques may be realized as a method for indexing backup data. The method may comprise generating a content hash for an item being backed up. The item may be associated with a resource name and the content hash may be used as an identifier in backup and indexing. The method may further comprise saving an entry for the item in an index database. The entry may comprise a resource list which may comprise the resource name and a reference count associated with the resource name. Moreover, the method may comprise setting a value for the reference count.

24 Claims, 5 Drawing Sheets

TECHNIQUES FOR GLOBAL SINGLE INSTANCE INDEXING FOR BACKUP DATA

CROSS-REFERENCE TO RELATED APPLICATIONS

This patent application claims priority to U.S. Provisional Patent Application No. 60/976,313, filed Sep. 28, 2007, which is hereby incorporated by reference herein in its entirety.

FIELD OF THE DISCLOSURE

The present disclosure relates generally to data storage systems and, more particularly, to techniques for global single instance indexing for backup data.

BACKGROUND OF THE DISCLOSURE

In current Information Technology (IT) environments, data backup may be a necessary task. The purpose of backup may be to provide protection and operational recoverability on client machines. Generally, a backup application may take snapshots of active data periodically to create backup images in order to provide a method of recovering records that have been deleted or destroyed. Backup operation therefore protects active data that may be changing on a frequent basis. Thus, backup may be designed as a short-term insurance policy to facilitate disaster recovery.

One problem with today's backup applications may be the ability to perform fast searches across all backup data. Since a typical backup operation may involve a large set of data, a vast amount of backup data may be generated because periodic images may be taken in a high frequency (e.g., daily). To search all backup data for specific data items may be a challenge.

One solution may be to use indexing technology, which may use an index engine to index data items to generate one entry for each data item in an index database and may provide fast search capability over large amounts of data. However, one of the problems associated with such a technique may be a limitation of the number of entries generated in the index database by the index engine. For example, one typical index engine has a limit of 6 million entries, and another enterprise index engine has a limit of 30 million entries. In a typical IT environment, the index engine's limit may be reached after a few backup cycles. One way to deal with this problem is to dedicate multiple inter-connected machines for indexing (e.g., federated indexers). However, the problem still remains for using indexing technology without hitting the limit (e.g., without using federated indexers).

In view of the foregoing, it may be understood that there are significant problems and shortcomings associated with current data storage technologies.

SUMMARY OF THE DISCLOSURE

Techniques for global single instance indexing for backup data are disclosed. In one particular exemplary embodiment, the techniques may be realized as a method for indexing backup data. The method may comprise generating a content hash for an item being backed up. The item may be associated with a resource name and the content hash may be used as an identifier in backup and indexing. The method may further comprise saving an entry for the item in an index database. The entry may comprise a resource list which may comprise the resource name and a reference count associated with the resource name. Moreover, the method may comprise setting a value for the reference count.

In accordance with other aspects of this particular exemplary embodiment, the resource name may be location of the item on a client machine.

In accordance with further aspects of this particular exemplary embodiment, the content hash may be an indexer ID of an indexer schema.

In accordance with additional aspects of this particular exemplary embodiment, saving an entry for the item in the index database may further comprise determining the entry for the item already exists and determining the resource name already exists. Further, setting a value for the reference count may comprise increasing the value for the reference count by one.

In accordance with one aspect of this particular exemplary embodiment, saving an entry for the item in the index database may further comprise determining the entry for the item does not exist, inserting the entry for the item in the index database, and adding the resource name to the resource list. Further, setting a value for the reference count may comprise setting the value for the reference count as one.

In accordance with another aspects of this particular exemplary embodiment, saving an entry for the item in the index database may further comprise determining the entry for the item already exists, determining the resource name does not exist, and adding the resource name to the resource list. Further, setting a value for the reference count may comprise setting the value for the reference count as one.

In accordance with yet another aspects of this particular exemplary embodiment, the method may further comprise receiving a search request at a search engine, processing the search request against the index database, and returning one or more search results to a client. The catalog search request may comprise metadata retrieved in a search result. Searching backup catalog to resolve location of searched data may comprise determining a location of searched data on a backup image. Additionally, the method may comprise receiving a catalog search request to search backup catalog, searching backup catalog to resolve location of searched data, retrieving searched data from the location, and returning searched data to the client.

In accordance with still another aspects of this particular exemplary embodiment, the method may further comprise determining a backup image has expired, retrieving an identifier and resource name for a data item in the backup image, locating entry for the identifier in the index database, and decreasing reference count associated with the resource name by one. Also, the method may comprise determining the reference count does not reach zero. Moreover, the method may comprise determining the reference count reaches zero, and deleting the resource name from the resource list. Further, the method may comprise determining the resource list has no remaining resource name, and purging the entry from the index database. Additionally, the method may comprise determining the resource list has at least one remaining resource name.

In accordance with a further aspect of this particular exemplary embodiment, at least one signal embodied in at least one carrier wave for transmitting a computer program of instructions configured to be readable by at least one processor for instructing the at least one processor to execute a computer process for performing the method as recited is provided.

In accordance with a yet further aspect of this particular exemplary embodiment, at least one processor readable carrier for storing a computer program of instructions configured to be readable by at least one processor for instructing the at least one processor to execute a computer process for performing the method is provided.

In another particular exemplary embodiment, the techniques may be realized as a system for performing global single instance indexing for backup data. The system may comprise an index engine. The index engine may be configured to generate a content hash for a data item being indexed. The data item may be associated with a resource name. The index engine may be further configured to save an entry for the data item in an index database. The entry may comprise the content hash as an indexer ID and the resource name. The index engine may be additionally configured to set a value for a reference count associated with the resource name.

In accordance with other aspects of this particular exemplary embodiment, the index engine may be further configured to update the entry in the index database when a backup image containing the data item expires.

In accordance with further aspects of this particular exemplary embodiment, the index engine may reside on an index server.

In accordance with additional aspects of this particular exemplary embodiment, the system may also comprise a search engine. The search engine may be configured to search the index database with one or more searchable attributes of an indexer schema. Further, the indexer schema may comprise an indexer ID, a resource list, searchable attributes and unsearchable attributes.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
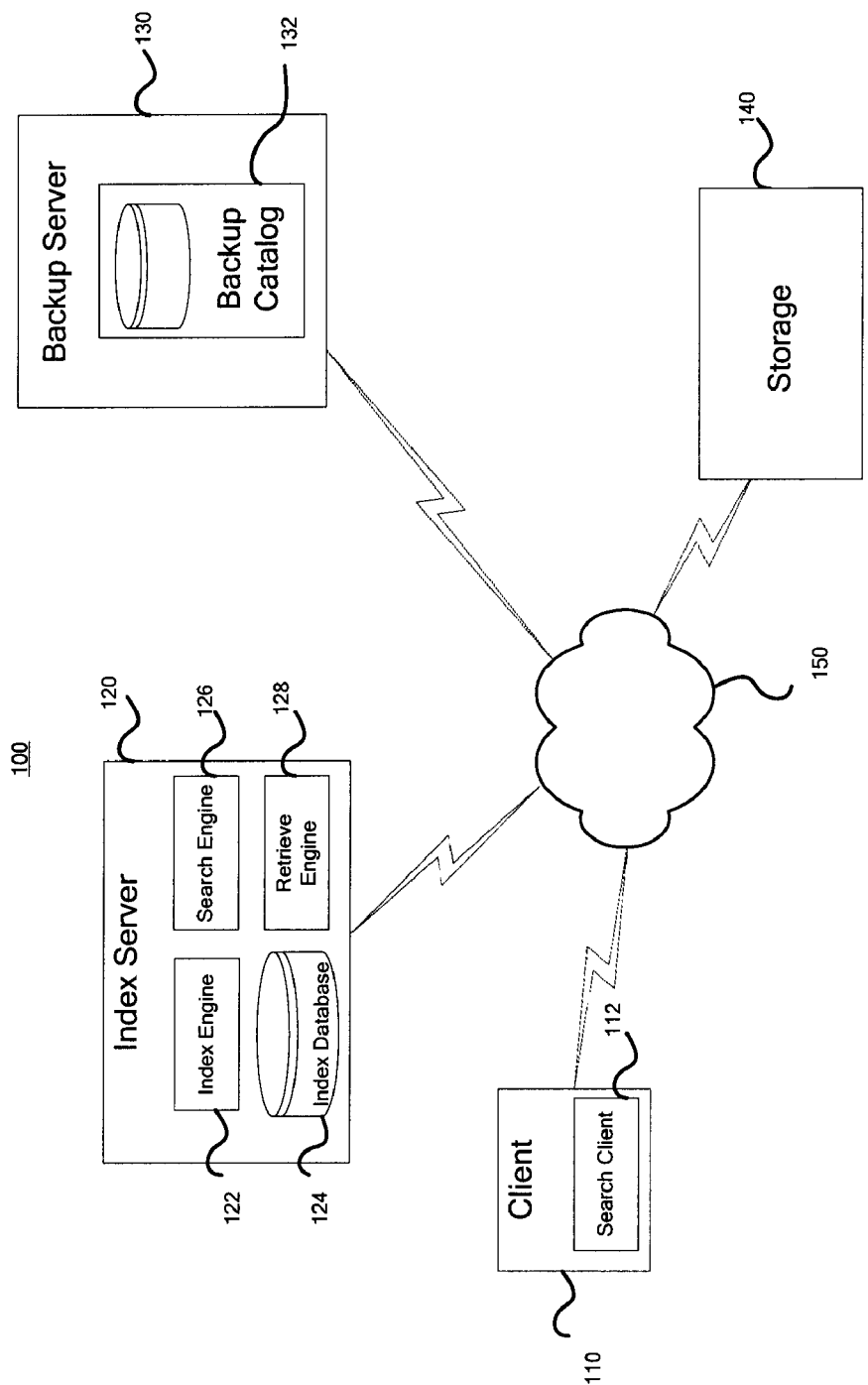
FIG. 1 shows a system for a global single instance indexing for backup data in accordance with an embodiment of the present disclosure.

Referring to FIG. 1, there is shown a system 100 for a global single instance indexing for backup data in accordance with an embodiment of the present disclosure. Client 110 may represent a computing device containing data that needs backup. Client 110 may contain a search client 112. Backup server 130 may be operatively connected to network 150 and may manage backup operations for one or more clients (e.g., Client 110) on network 150. A backup catalog 132 may be maintained on backup server 130. Backup catalog 132 may keep records of the items on backup images. Backup server 130 may use storage 140 for to store backup images. Storage 140 may be a storage-area network, a raid array, a tape drive, a disk drive, or other storage devices.

Index server 120 may be operatively connected to network 150. Index server 120 may comprise an index engine 122 and an index database 124. In some embodiments, index engine 122 and index database 124 may be contained on backup server 130. In one or more embodiments, index engine 122 and index database 124 may be contained on the client 110.

Index server 120 may work with backup server 130 to create/manage an index database 124 that may contain a global single instance for an item contained in one or more backup images. That is, an item may have only one entry in the index database 124 even if the item may have duplicate copies from different locations of one client machine (e.g., Client 110) or multiple client machines, and may be in multiple backup images. For example, a backup data item may be a file. The file may have duplicate copies on multiple machines, or in different directories of one machine. Multiple backup images containing the file may be created. The multiple backup images may be backup images for different machines, or for different directories, or for same location but at different times. But only one entry may be generated for the file in the index database 124.

The global single instance for an item in the index database 124 may be generated when backup server 130 performs a backup operation on a client machine (e.g., Client 110). Backup server 130 may identify each item that needs backup and generate a content hash for the item. The item may be any data that may need backup (e.g., email, file). The content hash may be unique and may be used as an indexer identifier. The indexer identifier may be saved as part of metadata for a record of the item in the backup catalog 132. Metadata may be information describing the item (e.g., creation date, size, author). The indexer identifier may also be used as an indexer ID in the index database 124. The index ID may be part of an indexer schema which will be described in detail later. Backup server 130 may further identify a resource name for the item. The resource name may be the physical location of the item on the client machine (e.g., file location on Client 110).

After saving the record of the item in the backup catalog 132, the system 100 may direct Index engine 122 to use the index ID to determine whether an entry for the item is already in the index database 124. A search of the index database 124 may be performed for the indexer ID. If an entry for the item is not found in the index database 124, the index engine 122 may generate an entry in the item database 124 for the item. The indexer ID may be part of an indexer schema saved for the entry. The indexer schema may further comprise the resource name (e.g., location from where the item is backed up) and a corresponding reference count associated with the resource name. The corresponding reference count may be set as one because this is the first backup image containing the item for the resource name. The resource name may be saved as a part of a resource list. The indexer schema, the resource list, the resource name and the reference count will be described in detail later.

If an entry for the item is found in the index database 124, the index engine 122 may update the existing entry for the item. For example, a previous backup operation may have already generated a previous backup image containing the item, thus an entry for the item may have already been saved in the index database 124. The previous backup image may be a backup image for the same file location. Then the resource name (e.g., file location) may be already in the resource list, index engine 122 may increase the reference count by one. If the previous backup operation was performed on a different machine or a different file directory containing a copy of the item. The resource name (e.g., file location) may not be in the resource list for the existing entry, then the index engine 122 may insert the resource name in the resource list and set a reference count associated with the resource name to one.

The index server 120 may further comprise a search engine 126 and a retrieve engine 128. The search engine 126 may receive a search request from a user via a search client 112 and then search the index database 124 for one or more searchable attributes based on the user's search criteria. The one or more searchable attributes may be a subset of metadata attributes of the indexer schema. For example, a user may want to search backup images for a file by a file name, or an email by subject of the e-mail. In one or more exemplary embodiments, one or more search clients may be contained on index server 120, backup server 130, and/or other client machines.

For each search, search engine 126 may generate one or more search results. That is, multiple entries from the index database 124 may match the search criteria. Each search result returned from search engine 126 may include all metadata attributes for the indexer schema. As previously noted, the indexer schema will be described in detail later. When the user selects one search result, the search engine 126 may use the metadata attributes of the indexer schema returned with the search result (e.g., resource list, file name, index ID) to search the backup catalog 132. The metadata attributes may limit the catalog search to a small set of information. Therefore, the physical location of the item (e.g., a backup image) may be resolved quickly. Once the physical location of the item is resolved (e.g., a specific backup image may be identified), the retrieve engine 128 may retrieve the item from the storage 140 (e.g., from the specific backup image).

The index database 124 may be updated when a backup image expires. For example, when a backup image expires, the backup server 130 may work with index server 120 to update the index database 124. For each item on the expiring backup image, the index server 120 may retrieve the indexer ID for the item from the backup catalog 132. The index server 120 may pass this information to the index engine 122. The index engine 122 may locate the entry for the item in the index database 124 with the indexer ID. The index database 124 may be designed to locate the entry for the item in the index database 124 using the indexer ID as a fast operation. The index server 120 may also retrieve the resource name (e.g., original location from where the item was backed up) from the backup catalog 132 for the item. The index engine 122 may decrease the reference count associated with the resource name in the index database 124. If the reference count reaches zero, the index engine 122 may remove the resource name from the resource list for the entry. If there is no resource name remaining in the resource list for the entry, the index engine may purge the entry for the item from the index database 124.

Figure 2:
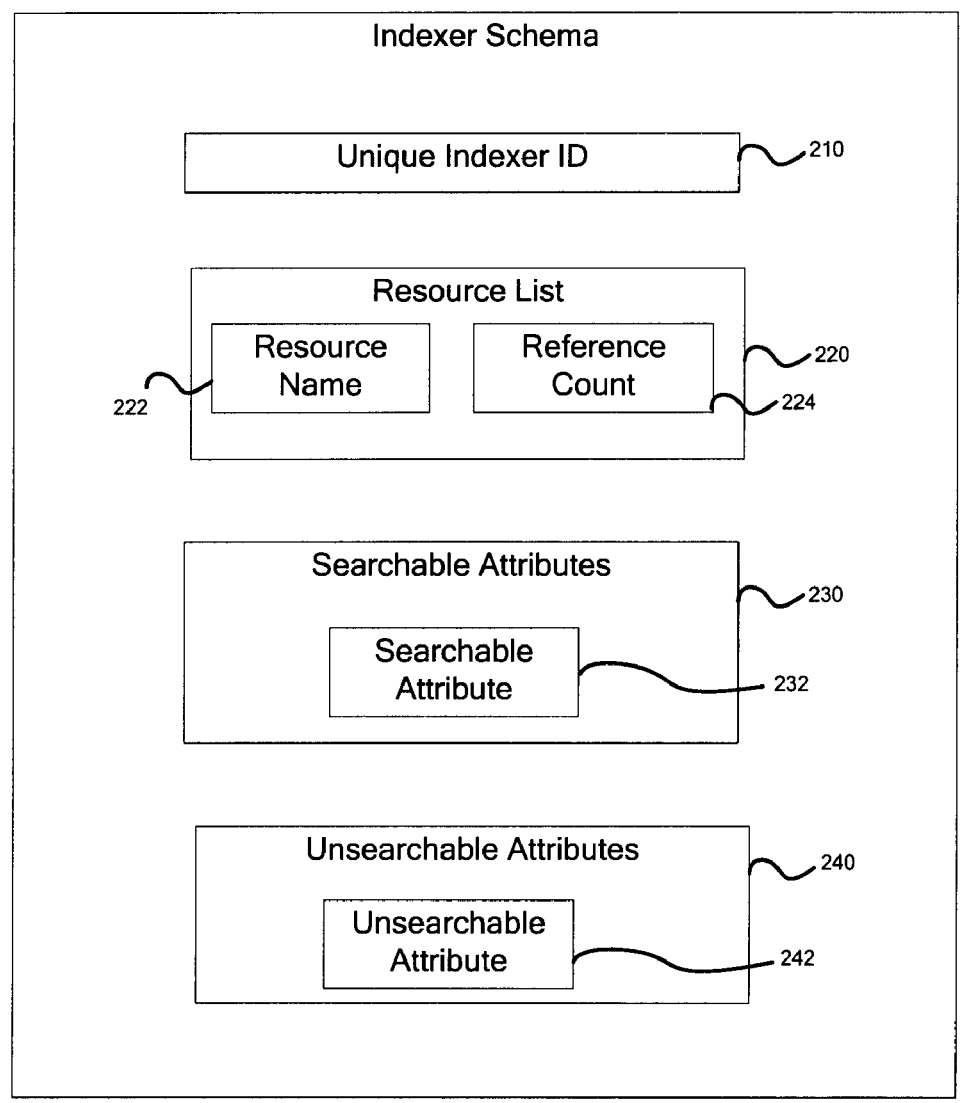
FIG. 2 shows a schematic view of an indexer schema in accordance with an embodiment of the present disclosure.

Referring to FIG. 2, there is shown an indexer schema 200 in accordance with an embodiment of the present disclosure. The indexer schema 200 may comprise an indexer ID 210. As previously noted, the indexer ID 210 may be a unique identifier generated by computing a content hash of an item being backed up. Therefore, the indexer ID may be a unique ID.

The indexer schema 200 may also comprise a resource list 220. The resource list 220 may comprise a resource name 222 and a reference count 224. The reference count 224 may be refereed to as a reference count associated with the resource name 222. The reference count 224 may record the number of references to the resource name 222.

The resource list 220 may contain multiple resource names because multiple backup images may contain duplicate copies of the same item from different machines or different directories. As previously noted, a resource name may be the original location of an item when the item was backed up. More than one resource names may be added to the resource list 220 when backup operation occurs for same item when an item may have duplicate copies located in different locations that being backed up. Corresponding reference count associated with each resource name may be maintained in the resource list 220. Corresponding reference count associated with each resource name may be increased or decreased based on whether a backup image containing the item from the resource name has been created or has expired.

For example, an item backed up may be a file on a Windows file system (e.g., C:\directoryA). At the same time, the file may have a duplicate copy under a different subdirectory (e.g., D:\directoryB). Since the content of the two files may be same, the two files may share same content hash. The two files share one indexer ID. Thus, the entry for the item in index database 124 may have a resource list with two resource names. One may be C:\directoryA, the other may be D:\directoryB. Since directories C:\directoryA and D:\directoryB may each have multiple backup images, the entry for the indexer ID may have multiple reference counts associated with each resource name. For example, C:\directoryA may have been backed up three times, and D:\directoryB may have been backed up twice. Therefore, the reference count associated with the resource name of the C:\directoryA may have a reference count of three, and the reference count associated with D:\directoryB may have a reference count of two.

When an existing backup image for C:\directoryA containing the item expires, the reference count associated with resource name of C:\directoryA may be decreased by one. When the last existing backup image for C:\directoryA containing the item expires, the corresponding reference count may be reduced to zero. If the reference count associated with one particular resource name reaches zero, the particular resource name and the corresponding reference count may be deleted from the resource list 220. As noted previously, when a last remaining resource name is deleted from a resource list, there may be no backup images containing the item associated with the entry containing the resource list. The entry may be purged from an index database.

The indexer schema 200 may also comprise of searchable attributes 230. In the schematic view of indexer schema 200, only one searchable attribute 232 may be shown. For example, the searchable attribute 232 may be a file name. In another example, the searchable attribute 232 may be a subject of an e-mail. It should be noted that the searchable attributes 230 may comprise of a plurality of searchable attributes 232. Each searchable attribute 232 may be a distinct attribute that is searchable. For example, for a file, searchable attributes may be file name, creation date, author, etc.

The indexer schema 200 may further comprise unsearchable attributes 240. The unsearchable attribute 242 may be an attribute of an item that is non-searchable. For example, if the back up data item is an e-mail, the unsearchable attribute 242 may be an attachment. If the backup data item is a file, the unsearchable attribute 242 may be a date the file was last modified. In one or more embodiments, there may be a plurality of unsearchable attribute 242.

By using content hash as a unique indexer ID, a resource list with resource names and corresponding reference counts, one backup data item may only have one entry in the index database. Therefore, duplicated entries for backup data items may be avoided. Scalability of index engine may be improved. Further, performance of index engine may be improved. Leveraging indexing technology on enterprise backup application may be possible.

Figure 3:
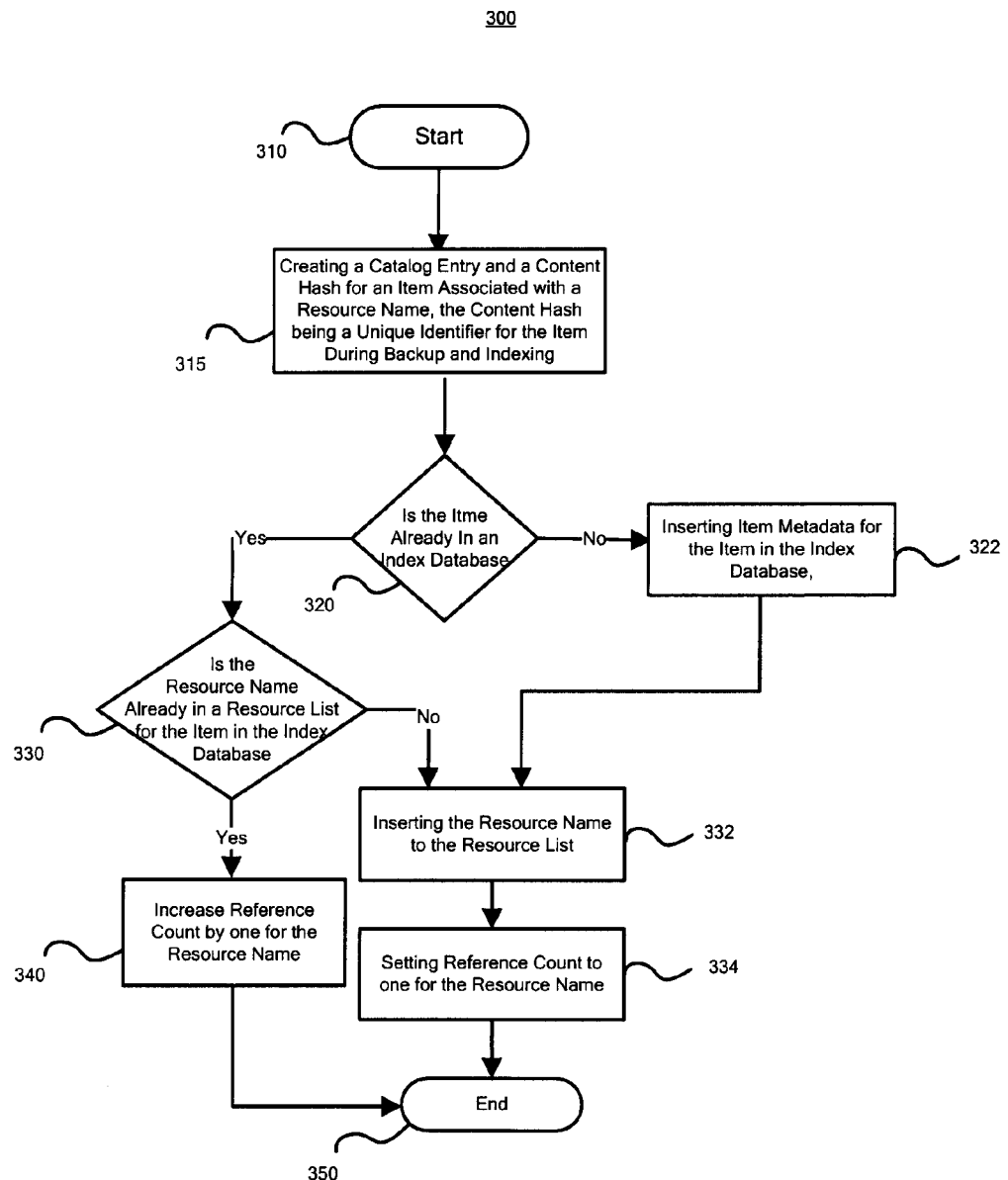
FIG. 3 shows a flow chart illustrating a process for performing global single instance indexing in accordance with an embodiment of the present disclosure.

Referring to FIG. 3, there is shown a method 300 for performing global single instance indexing in accordance with an embodiment of the present disclosure. Method 300 may start at block 310. At block 315, the method may create a catalog entry and a content hash for the item associated with a resource name being backed up. The content hash may be a unique identifier for the item being backed up. As previously described, the resource name may be a location where the item is located. For example, the item may be a file. Then the resource name may be the file's location where backup operation is performed. At block 320, the method may determine whether the item has already been inserted in the index database. If not, the method may continue at block 322 where the item and its metadata (e.g., indexer schema) may be inserted in the index database. The method may continue to 332 the method may insert the resource name to the resource list. At block 334, the method may set a reference count associated with the resource name to one. The method may end at block 350.

If at block 320, the method determines that the backup item is already in the index database, it may proceed from block 320 to block 330. At block 330 the method may determine whether the resource name has already been saved into the resource list for the item in this index database. If yes, the method may continue to 340 where the reference count associated with the resource name may be increased by one. The method may end at block 350. If at block 330, the method determines the resource name is not in the resource list in the index database, the method may proceed from block 330 to block 332. At block 332, the method may insert the resource name to the resource list. At block 334, the method may set a reference count associated with the resource name to one. Then the method may proceed to 350 and end.

Figure 4:
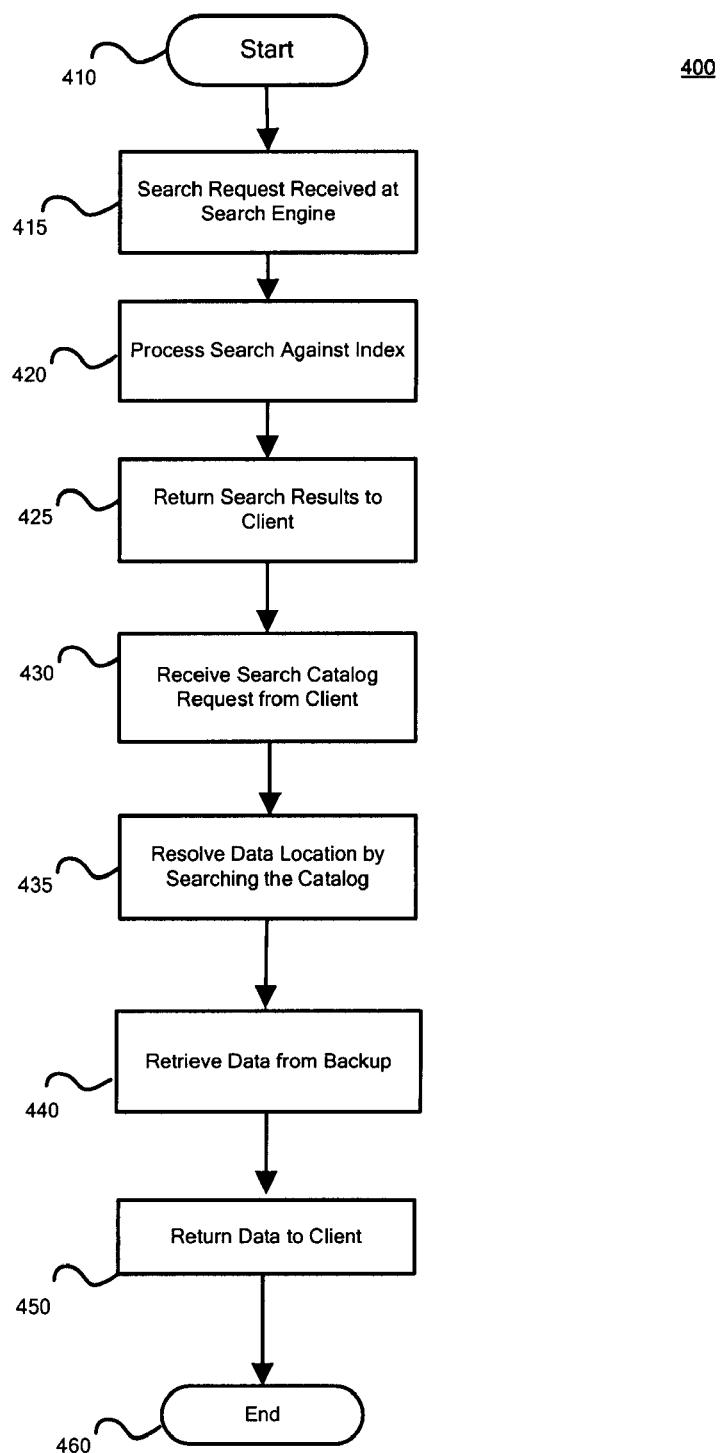
FIG. 4 shows a flow chart illustrating a process for searching and retrieving data using a global single instance index database in accordance with an embodiment of the present disclosure.

Referring to FIG. 4, there is shown a method 400 for searching and retrieving data using a global single instance index database in accordance with an embodiment of the present disclosure. Method 400 may start at block 410. At block 415, the method may receive a search request at the search engine. The search request may comprise a searchable attribute or a plurality of searchable attributes. For example, a client may search for a file name and/or creation date for the file. At block 420, the method may process the search request using the index database. At block 425, one or more search results may be returned to the client. Each search result may comprise an indexer schema (e.g., the indexer ID, resource list, searchable attribute, and non-searchable attribute) for an item matching the search criteria. At block 430, the search engine may receive a request to search the backup catalog based on a user's selection of one search result. The request may comprise the attributes just described above. At block 435, the method may resolve the data location by searching the backup catalog because the attributes may limit the catalog search to a small set of information. The physical location (e.g., a backup image) of the item may be resolved quickly. At block 440, the method may retrieve data from the backup image. At block 450, retrieved data may be returned to the client. At block 460, the method may end.

Figure 5:
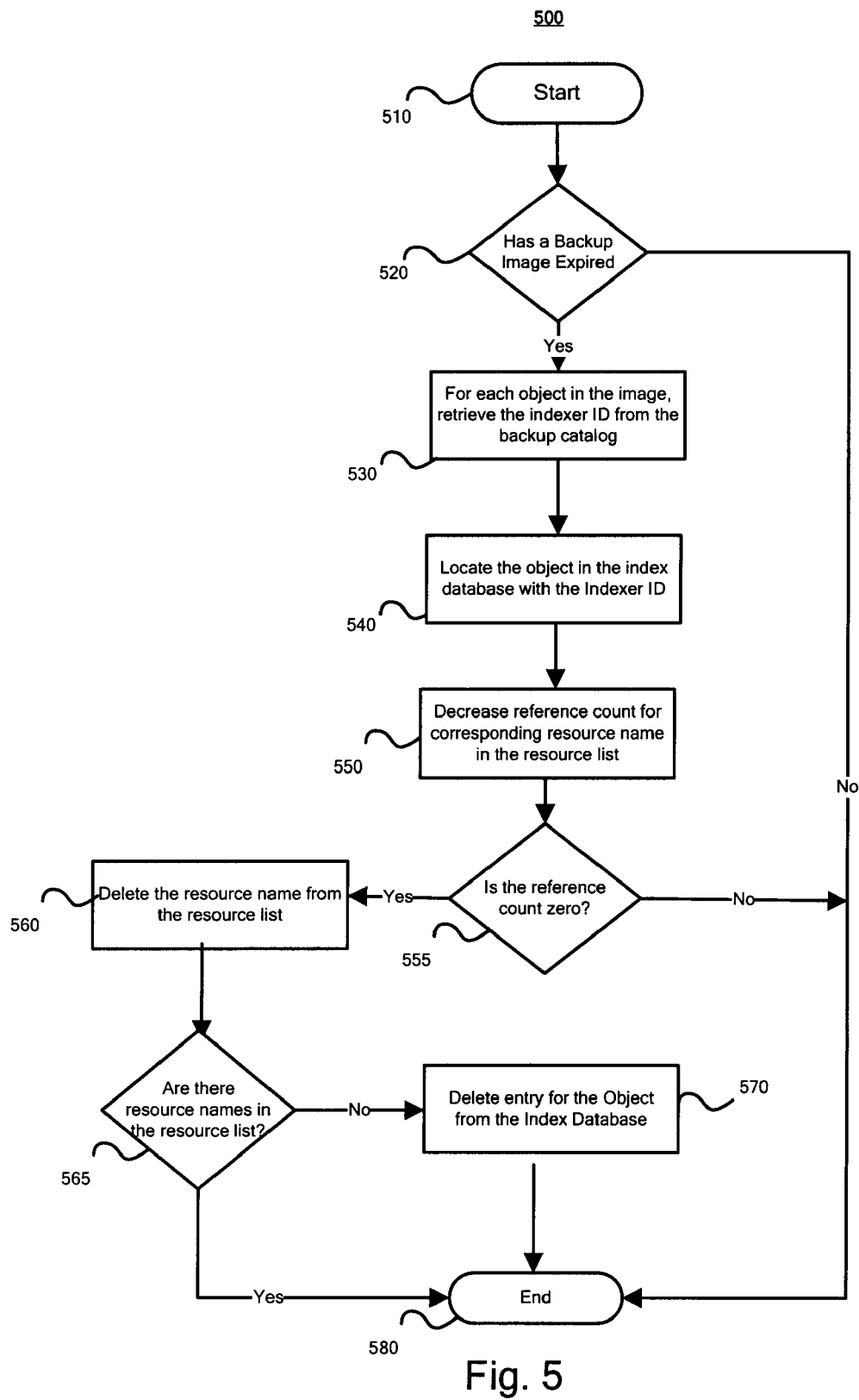
FIG. 5 shows a flow chart illustrating a process for updating a global single instance index database when a backup image expires in accordance with an embodiment of the present disclosure.

Referring to FIG. 5, there is shown a method 500 for updating a global single instance index database when a backup image expires in accordance with an embodiment of the present disclosure. Method 500 may start at block 510. At block 520, the method may determine whether a backup image has expired. If the backup image has not expired, the method may end at block 580. If at block 520, the method determines that the backup image has expired, the method may proceed from block 520 to block 530. At block 530, for each item in the backup image, the method may retrieve the indexer ID from the backup catalog. At block 540, the method may locate the item in the index database with the retrieved indexer ID. At block 550, the method may decrease reference count associated with a corresponding resource name in the resource list. For example, the expired backup image may be for the c: drive and the object has a corresponding resource name for the c: drive in the resource list. The reference count associated with that corresponding resource name may be decreased by one.

At block 550, the method may determine whether the reference count associated with the corresponding resource name is zero. If not, the method may end at block 580. If yes, the method may proceed from block 555 to block 560. At block 560, the method may delete the resource name from the resource list. For example, the expired backup image was a backup image for a c: drive. The object identified may be a file from a subdirectory from the c: drive. This backup image may be the last backup image for this file from the c: drive. Therefore, the reference count reaches zero and there are no backup images for this c: drive for this particular file. Thus, this resource name may be deleted from the resource list for this item.

At block 565, the method may determine whether there are other resource names in the resource list for this item. If yes, the method may end at block 580. If no, the method may proceed from block 565 to block 570 where the method may delete the entry for the object from the index database. For example, this backup image may be the last backup image for an item. When this backup image expires, there are no other backup images containing this item. Therefore, this item may be deleted from the index database. At block 580, the method may end. The method 500 may reduce the size of stored backup images and stored indexes. Furthermore, this method 500 may increase the efficiency and accuracy of indexes used for searching data.

At this point it should be noted that the technique for shared persistent storage optimization in accordance with the present disclosure as described above typically involves the processing of input data and the generation of output data to some extent. This input data processing and output data generation may be implemented in hardware or software. For example, specific electronic components may be employed in a computer processor or similar or related circuitry for implementing the functions associated with file creation, transfer, deletion, or network communication in accordance with the present disclosure as described above. Alternatively, one or more processors operating in accordance with stored instructions may implement the functions associated with file creation, transfer, deletion, or network communication in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

The invention claimed is:

1. A method for performing global single instance indexing for backup data comprising:
   generating, using at least one computer processor, a content hash for an item being backed up, the item being associated with a resource name and the content hash being used as an identifier in backup and indexing;
   determining the entry for the item already exists using the content hash;
   updating the entry for the item in an index database, wherein the entry is configured to refer to multiple copies of the item, wherein the entry comprises a resource list which comprises the resource name and a reference count associated with the resource name; and
   setting a value for the reference count, wherein the reference count improves scalability of global single instance indexing by reducing duplicate entries for items being backed up.

2. The method of claim 1, wherein the resource name is a location of the item on a client machine.

3. The method of claim 1, wherein the content hash is an indexer ID of an indexer schema.

4. The method of claim 1, wherein saving an entry for the item in the index database further comprising:
   determining the entry for the item already exists; and
   determining the resource name already exists.

5. The method of claim 4, wherein setting a value for the reference count comprises increasing the value for the reference count by one.

6. The method of claim 1, wherein saving an entry for the item in the index database further comprising:
   determining the entry for the item does not exist;
   inserting the entry for the item in the index database; and
   adding the resource name to the resource list.

7. The method of claim 6, wherein setting a value for the reference count comprises setting the value for the reference count as one.

8. The method of claim 1, wherein saving an entry for the item in the index database further comprising:
   determining the entry for the item already exists;
   determining the resource name does not exist; and
   adding the resource name to the resource list.

9. The method of claim 8, wherein setting a value for the reference count comprises setting the value for the reference count as one.

10. The method of claim 1, further comprising:
    receiving a search request at a search engine;
    processing the search request against the index database; and
    returning one or more search results to a client.

11. The method of claim 10, further comprising:
    receiving a catalog search request to search backup catalog;
    searching backup catalog to resolve location of searched data;
    retrieving searched data from the location; and
    returning searched data to the client.

12. The method of claim 11, wherein the catalog search request comprises metadata retrieved in a search result.

13. The method of claim 11, wherein searching backup catalog to resolve location of searched data comprises determining a location of searched data on a backup image.

14. The method of claim 1, further comprising:
    determining a backup image has expired;
    retrieving an identifier and resource name for a data item in the backup image;
    locating an entry for the identifier in the index database; and
    decreasing reference count associated with the resource name by one.

15. The method of claim 14, further comprising determining the reference count does not reach zero.

16. The method of claim 14, further comprising:
    determining the reference count reaches zero; and
    deleting the resource name from the resource list.

17. The method of claim 16, further comprising:
    determining the resource list has no remaining resource name; and
    purging the entry from the index database.

18. The method of claim 16, further comprising determining the resource list has at least one remaining resource name.

19. At least one non-transitory processor readable storage medium storing a computer program of instructions configured to be readable by at least one processor for instructing the at least one processor to execute a computer process for performing the method as recited in claim 1.

20. A system for performing global single instance indexing for backup data comprising:
    an index engine, comprising at least one computer processor, the index engine configured to:
      generate a content hash for a data item being indexed, the data item being associated with a resource name;
      determine the entry for the item already exists using the content hash;
      update the entry for the data item in an index database, wherein the entry is configured to refer to multiple copies of the item, wherein the entry comprises the content hash as an indexer ID and the resource name; and
      set a value for a reference count associated with the resource name in the index database entry, wherein the reference count improves scalability of global single instance indexing by reducing duplicate entries for items being backed up.

21. The system of claim 20, wherein the index engine is further configured to update the entry in the index database when a backup image containing the data item expires.

22. The system of claim 20, wherein the index engine resides on an index server.

23. The system of claim 20, further comprising a search engine, wherein the search engine is configured to search the index database with one or more searchable attributes of an indexer schema.

24. The system of claim 23, wherein the indexer schema comprises an indexer ID, a resource list, searchable attributes and unsearchable attributes.

* * * * *